United States Patent
Wippersteg et al.

(10) Patent No.: US 7,873,617 B2
(45) Date of Patent: Jan. 18, 2011

(54) DEVICE AND METHOD FOR COORDINATING A MACHINE FLEET

(75) Inventors: Heinz-Hermann Wippersteg, Buende (DE); Thilo Steckel, Guetersloh (DE); Werner Fitzner, Sassenberg (DE); Norbert Diekhans, Guetersloh (DE); Kai Oetzel, Bielefeld (DE)

(73) Assignee: CLAAS Selbsfahrende Erntemaschinen GmbH, Harsewinkel (DE)

( * ) Notice: Subject to any disclaimer, the term of this patent is extended or adjusted under 35 U.S.C. 154(b) by 430 days.

(21) Appl. No.: 11/859,228

(22) Filed: Sep. 21, 2007

(65) Prior Publication Data

US 2008/0098035 A1 Apr. 24, 2008

(30) Foreign Application Priority Data

Sep. 22, 2006 (DE) .................... 10 2006 045 280

(51) Int. Cl.
*G06F 7/00* (2006.01)
*G06F 17/30* (2006.01)

(52) U.S. Cl. .................... 707/705; 705/8; 707/944; 707/951

(58) Field of Classification Search ................ 340/988; 707/603, 705
See application file for complete search history.

(56) References Cited

U.S. PATENT DOCUMENTS

| 5,712,782 | A  * | 1/1998  | Weigelt et al. ........... 701/50 |
| 6,769,013 | B2 * | 7/2004  | Frees et al. ............. 709/205 |
| 6,990,459 | B2 * | 1/2006  | Schneider ................. 705/8 |
| 7,152,035 | B1 * | 12/2006 | Suhy, Jr. ................. 705/1 |
| 7,397,392 | B2 * | 7/2008  | Mahoney et al. ......... 340/988 |
| 7,487,019 | B2 * | 2/2009  | Estes et al. ............. 701/33 |
| 7,734,493 | B1 * | 6/2010  | Anbil .................... 705/8 |
| 7,742,860 | B2 * | 6/2010  | Diekhans et al. ........ 701/50 |
| 2004/0073468 | A1 * | 4/2004 | Vyas et al. .............. 705/8 |
| 2004/0122894 | A1  | 6/2004 | Wippersteg |
| 2005/0125247 | A1 * | 6/2005 | Ding et al. ............. 705/1 |
| 2005/0146428 | A1 * | 7/2005 | Mahoney et al. ........ 340/521 |
| 2006/0143060 | A1 * | 6/2006 | Conry et al. ............ 705/8 |
| 2007/0173991 | A1 * | 7/2007 | Tenzer et al. .......... 701/29 |
| 2007/0271002 | A1 * | 11/2007 | Hoskinson et al. ...... 700/245 |
| 2009/0187450 | A1 * | 7/2009 | Kocis et al. ............ 705/8 |

FOREIGN PATENT DOCUMENTS

DE         102 45 169         4/2004

* cited by examiner

*Primary Examiner*—John R. Cottingham
*Assistant Examiner*—Susan F Rayyan
(74) *Attorney, Agent, or Firm*—Michael J. Striker

(57) ABSTRACT

A device for coordinating a machine fleet includes a memory for storing a large number of data records, an interface for communicating with several users who are capable of making changes to the data records, in the case of which each data record represents a given portion of the working capacity of a machine in the machine fleet, and the changes relate to the assignment of the portion of the working capacity represented by the data record to the users making the change, and an administration unit designed to allow a change to be made to a data record by a user requesting the change if the data record is not assigned to any other user and an urgency of the change indicated by the requesting user reaches a threshold specified for the particular portion.

20 Claims, 3 Drawing Sheets

DEVICE AND METHOD FOR COORDINATING A MACHINE FLEET

CROSS-REFERENCE TO A RELATED APPLICATION

The invention described and claimed hereinbelow is also described in German Patent Application DE 10 2006 045 280.1 filed on Sep. 22, 2006. This German Patent Application, whose subject matter is incorporated here by reference, provides the basis for a claim of priority of invention under 35 U.S.C. 119(a)-(d).

BACKGROUND OF THE INVENTION

The present invention relates to a device and a method for coordinating a machine fleet, of mobile agricultural machines in particular, which allow the machines to be operated with a high degree of productivity.

Specialized agricultural machines such as harvesting machines are often required in an agricultural operation only for a brief period of time over the course of a year, during which the work in which the machine specializes is required. To increase his return on investment, the farmer may prefer—for business reasons—to not own these types of machines himself, but rather to reserve access to them for the period of time during which he needs them. The machines may be owned by a cooperative, a private contractor, or the like.

To organize this access, a data exchange device is required that enables a user to evaluate whether a desired access is possible, and that supports an allocation of the access that ensures full, efficient utilization of the machines.

A system that supports the exchange of information between users and mobile agricultural machines and allows users to make changes to information stored in the system is made known in DE 102 45 169 A1.

SUMMARY OF THE INVENTION

The object of the present invention is to refine a system of this type such that it supports a highly productive utilization of the mobile machines.

The object is attained by providing a device for coordinating a fleet of mobile agricultural machines that includes a memory for storing a large number of data records, an interface for communicating with several users, and an administration unit that is capable of making changes to the data records in response to the users' requests, each data record representing a given portion of the working capacity of a machine in the machine fleet.

The changes relate to the assignment of the portion of the working capacity represented by the data record to the users making the change. The administration unit is designed to allow a change to be made to a data record when so requested by a user if the data record is not assigned to any other user, and when an urgency of the change indicated by the requesting user reaches a threshold specified for the particular portion.

Given that the requesting unit is obliged to quantify the urgency of its request, the device—when assigning every data record to a user—may refer requesting users who have not been assigned to a certain data record to data records that may not be used by less flexible users, thereby satisfying the largest possible number of requesting users and ensuring good capacity utilization of the machines to be coordinated.

A specification for determining a distance between two data records is programmed in the administration unit, thereby enabling the administration unit to determine whether a given data record is located close to another data record or not. The administration unit is designed to define the threshold based on the frequency of assigned data records within data records located close to the data record to be changed. Based on the portion of already-assigned data records located close to the requested data record, the device may dynamically estimate how urgently the requested data record is required by the requesting units or by other external units.

Advantageously, each data record corresponds to an operating time period of a machine in the machine fleet. In this case, the distance between two data records is advantageously defined such that it increases as the time interval between the data records increases.

According to a first preferred embodiment, the administration unit is designed to ascertain the portion of already-assigned data records within data records located close to a given data record at predefined time intervals from the time corresponding to the given data record. That is, the urgency that a user must indicate in order to receive a requested data record does not change between two instances in which the extent of capacity utilization is ascertained. This improves the user's ability to predict the result of his request.

According to an alternative preferred embodiment, the administration unit is designed to ascertain the portion of already-assigned data records within data records located close to a given data record every time the given data record is requested. In this embodiment, the user is less able to predict the result of a request, but the capacity utilization of the machines is improved.

The threshold is advantageously a decreasing function of the time interval between the present time and the time corresponding to the data record, i.e., at a given frequency of assigned data records surrounding a given data record, the threshold is that much lower the closer in the future the time period corresponding to the given data record is. This ensures that data records that remain unassigned may be requested preferentially over the short term, and time periods in which the machines remain unused are minimized.

When the machine fleet includes several machines that are suitable for the same task, the distance between two data records assigned to two machines suitable for the same task is independent of the identity of the machines. That is, when the data records correspond to operating time periods of the machines, the distance—defined by the specification—between two data records assigned to two different machines and a third data record is always the same.

Since the urgency with which a certain working capacity portion of a machine is required by a user may change over time, the administration unit is advantageously designed to cancel—upon a user's request—an assignment of a data record to the external unit and to assign a new data record to him. A re-assignment of this type may take place without any additional requirements if the threshold for the new data record is lower than the threshold for the originally assigned data record. Otherwise, the re-assignment advantageously takes place only when the urgency indicated for the external unit is at least as great as the difference between the threshold for the new data record and the threshold for the originally assigned data record.

To make the evaluation of the urgency indicated by the various users objective and comparable, a catalog of criteria may be defined, the presence or absence of which may be checked objectively by the users in a decentralized manner, and which specifies a formula for calculating a quantitative urgency value based on the result of the check. This is advantageous in particular when the users are parts of the same economic unit, or when it may be assumed for other reasons that the users cooperate with each other without reservation and none of them attempts to create unjustified advantages at the costs of the others, or when the evaluation of the urgency takes place fully automatically without the possibility of external influence. In cases where the control device and the machine fleet, and the users belong to different economic units, it may be advantageous to measure the urgency via a monetary amount to be set for assigning the machine capacity to the external unit by the operator of the external unit to the operator of the machine fleet. The user is therefore able to plan his operating costs at an early point in time, and he may optimize them at any time, because he may determine whether possible additional costs that would be required to schedule harvesting machines at an ideal time or to reschedule compared to another, suboptimal time are justified by advantages, such as an anticipated higher quantity or quality of harvested crop material.

The object is further achieved by a method for coordinating a machine fleet that includes the following steps:

Provide a large number of data records in a memory, each data record representing a given portion of the working capacity of a machine in the machine fleet;

Receive a request from a user to change a data record, the change relating to the assignment of the portion of the working capacity represented by the data record to the user making the change;

Implement the requested change if the data record is not assigned to any other user and an urgency of the change indicated by the requesting user reaches a threshold specified for the particular portion.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
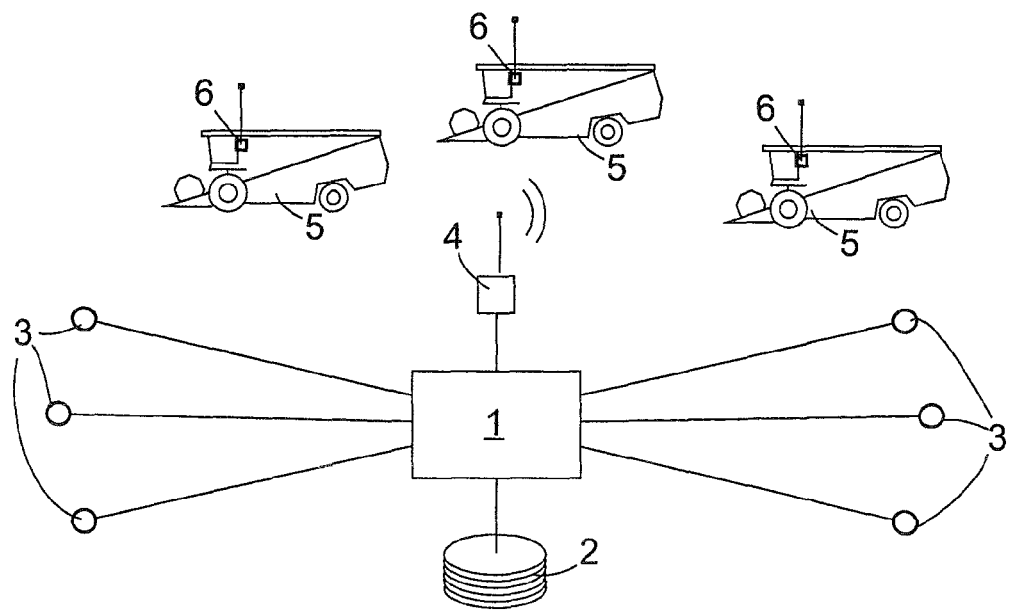
FIG. 1 shows a schematic depiction of a machine fleet with an inventive coordination device.

FIG. 1 shows a block diagram of the inventive coordination device and the environment in which it is used. An administration unit 1, which may be realized as a suitably programmed computer, is connected with a data memory 2 and several user end devices 3. A public or private telecommunications network, a computer network or the like may serve as the infrastructure for the connections to end devices 3 in a manner known per se.

Administration unit 1 is also connected with a radio interface 4, which enables communication with several machines 5 in a machine fleet. Machines 5 may be remote-controllable directly by administration unit 1 via instructions transmitted by radio interface 4. In the case of machines such as the combine harvester depicted here as an example, which perform tasks that cannot be reasonably or entirely automated, the control via administration unit 1 may be limited to transmitting working instructions to a data viewing device 6 installed in machine 5, so that an operator of machine 5 may read the instructions and implement them using machine 5.

As an exemplary application of the inventive coordination device, the planning of a harvesting campaign will be considered below. It is understood that the coordination device may also be used in other applications, when it is important to distribute limited resources to several users within a given time period in a manner such that a high rate of utilization of the resources is attained and the users' requirements are fulfilled in an optimal manner.

One problem that arises in the planning of a harvesting campaign is that a likely harvesting date and quantity—and, therefore the time and scope of the need for harvesting machines—may be only roughly estimated in advance. The reason is that the exact optimal point in time for harvesting and the quantity to be harvested then depend on a number of uncertainties that do not become known until the crops start growing or even until a few days before the actual harvesting date.

Due to fluctuations in temperature and precipitation during the growing period, for example, the actual point in time when maturation occurs may shift forward or backward by several days compared with a mean over many years, and the quantity to be harvested may deviate upward or downward from an expected value. Therefore, although it makes sense to schedule machine capacity for harvesting a given cultivated field at an early point in time, in order to ensure that the machine capacity is available, the earlier the planning is carried out, the greater the likelihood is that the scheduled time and machine capacity will not optimally satisfy the requirements.

The inventive coordination device takes this problem into account by requesting that a user 3—who wants to reserve a contingent of capacity of machines 5 for a certain period of time—state the urgency of his reservation, and by fulfilling this reservation only when the stated urgency reaches a threshold defined by administration unit 1. As a criterium for quantifying the urgency, e.g., the difference between the expected harvesting yields at the point in time requested for the reservation and a period of time that is one week earlier or later, for example, may be assumed. The quality of the crop material, which depends on the harvesting time, may also be taken into account.

The earlier the point in time of the reservation is, the smaller the difference is from this point in time, and, the urgency of the reservation is therefore that much lower. The later the reservation is made, the more accurately the user may forecast the expected difference, and, therefore, the urgency he indicates is that much greater. In the case—which is significant for practical application—that users 3 and operators of machines 5 belong to units that are economically independent of each other, and the operator of machines 5 are paid by users 3 for the use of machines 5, the urgency may also be easily quantified via a monetary amount that a user is willing to pay for the use of the machines at the desired point in time.

How economically the machines will be used depends decisively on the threshold of urgency that must be attained so that the machine capacity is reserved. A simple possibility is to program administration unit 1 with a specification that defines the threshold of urgency based solely on the date on which capacity should be reserved, and on the time interval between the date to be reserved and the point in time when the reservation was made. A specification of this type will generally define a high threshold for a reservation within a harvesting period that is expected based on experience, and it will define a low threshold for a reservation period outside of the expected harvesting period. The threshold for a given reservation period increases, the closer this reservation period comes. When a capacity contingent is still unreserved shortly before its date, its threshold may be lowered in order to increase the likelihood that it will be reserved soon, thereby ensuring that the machine capacity is utilized continually.

A method of this type is unable to satisfactorily take into account climate conditions during the growing period, which affect the harvesting date and quantity. Specifications for defining the threshold that make this possible will be presented below with reference to exemplary embodiments.

Figure 2:
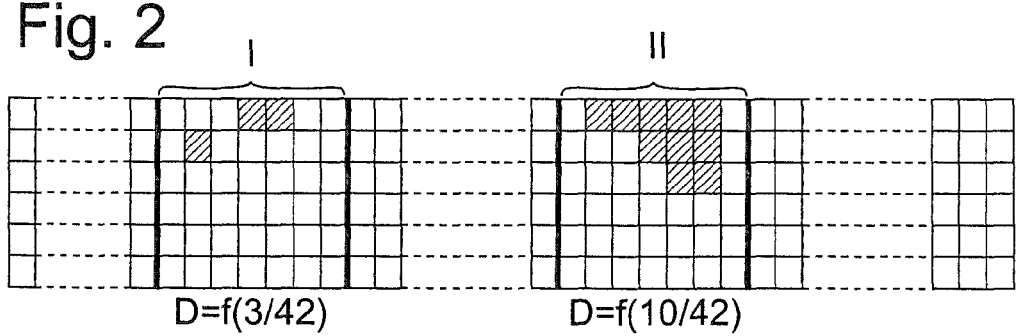
FIGS. 2 and 3 show schematic illustrations of data records in the memory of the control device at various times to explain a first method for calculating a threshold.

For this purpose, FIG. 2 shows a schematic illustration of the contents of data memory 2 at the point in time when the likely harvesting period of a crop to be harvested by machines 5 is still far in the future. The illustration shows a large number of blocks corresponding to a data record in memory 2, which are located in a matrix with a large number of rows and columns. Every column corresponds to a certain time period, e.g., one day, and every row is assigned to one of the machines 5. If the machine fleet includes machines 5 with different performance levels, several rows of the diagram may be assigned to a more powerful machine, so that each row approximately corresponds to a certain output of a machine, e.g., a certain number of tons of crop material.

For clarity, seven columns are grouped into one week using bold vertical lines in the diagram in FIG. 2. The shading of individual blocks in the diagrams indicates that the working capacity represented by the block has already been assigned to one of the users 3. Of the 42 total blocks in one week, three are assigned to earlier week I, and 42 are assigned to later week II. Week II is apparently closer to a time period that users 3 gauge to be optimal. To define urgency D that a user 3 must indicate in order to reserve a block for himself, administration unit 1 ascertains the capacity utilization of the machines in a given week, i.e., it ascertains the ratio of reserved blocks to the total number of blocks available during this week and uses the resultant ratio as the argument in a function f, which is an increasing function of this ratio. A user who will harvest a cultivated territory in a favorable climate, which typically has an early maturation time, is therefore prompted to preferably select—from between two harvesting times in week I or II during which he expects to obtain the same yield—the period in week I, so that time remains available in week II for other users 3 for whom harvesting dates in week I is unsuitable.

Figure 3:
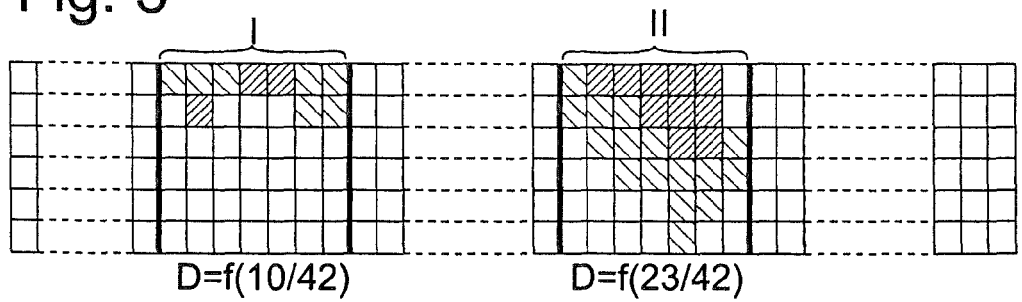

FIG. 3 shows the status of data memory 2 at a later point in time. Reservations that were added since the period of time shown in FIG. 2 are indicated by less shading in the applicable blocks. The level of capacity utilization in week I now has the same value, 10/42, as week II in FIG. 2, so the same urgency must therefore be specified for a reservation in week I as for the period of time shown in FIG. 2 for a reservation in week II. The capacity utilization of the latter has reached a value of 23/42 in this case. The urgency to be indicated for a reservation in this case is also higher here than is the case in FIG. 2.

Figure 4:
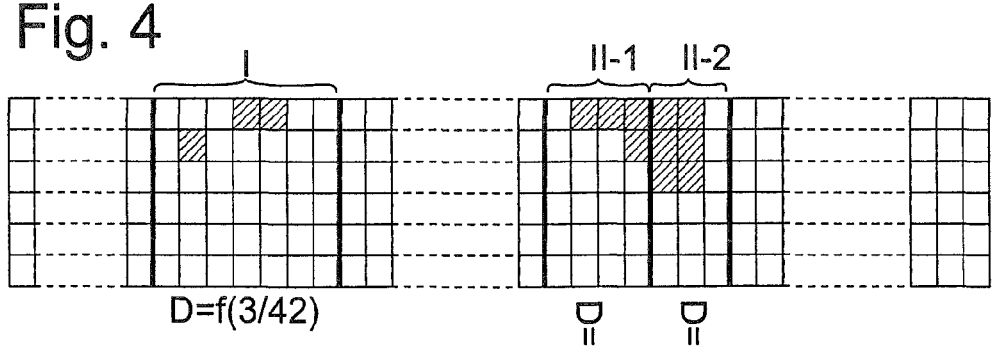
FIGS. 4 and 5 show schematic illustrations that are analogous to FIGS. 2 and 3, to explain a second method for calculating a threshold.
Figure 5:
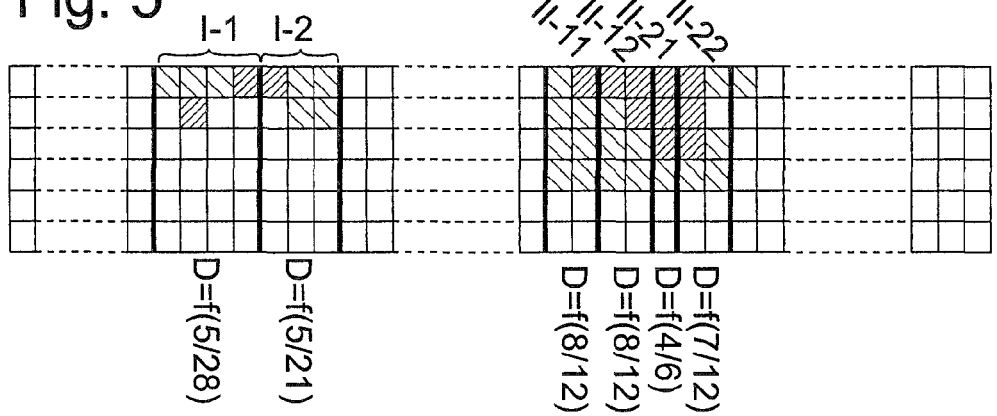

A calculation of the capacity utilization based on a fixed time period such as one week, as shown in FIGS. 2 and 3, may produce unsatisfactory results when the time period in which the demand by users 3 for machines 5 has reached its maximum is clearly shorter than this fixed time period. A situation such as this may result, in particular, when rain is forecast for a region during the harvesting period, and users 3 in the region are very interested in harvesting their territory before it rains. A method for ascertaining the extent of capacity utilization that takes this problem into account is illustrated in FIGS. 4 and 5. They show the contents of data memory 2 at the same points in time as in FIGS. 2 and 3.

When the number of booked blocks in a time period, e.g., week I or II, has reached a specified limit value, e.g., 10, administration unit 1 subdivides the time period into two partial time periods, i.e., partial time periods II-1, II-2 in the case of week II here. It sets the limit between the partial time periods such that the number of assigned blocks in the two partial time periods differ by as little as possible. This therefore results in partial time period II-1, which includes the first four days of week II and has a capacity utilization of 4/24, and partial time period II-2, which includes the remaining three days in the week, with a capacity utilization of 6/18. To reserve another block in partial time period II-2, a user 3 must therefore indicate a higher level of urgency than he would to make a reservation in partial time period II-1.

In FIG. 5, the progressing reservations carried out using the procedure described above have resulted in the subdivision of week I into partial time periods I-1, I-2, and in the subdivision of partial time periods II-1, II-2 into sub-intervals II-11, II-12, II-21, II-22, the capacity utilization of each of which is determined separately.

Figure 6:
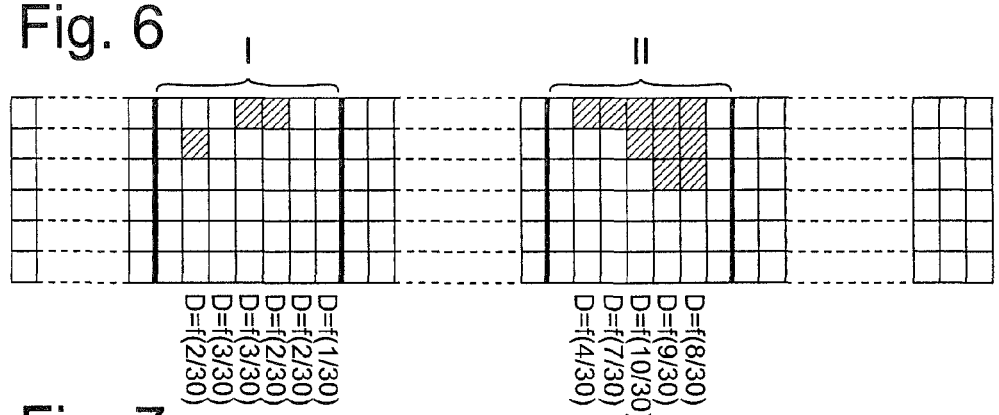
FIG. 6 shows a schematic illustration to explain a third method.

A method for defining threshold D, which is independent of a subdivision of the calendar into weeks, is illustrated in FIG. 6. The reservations shown are the same as in FIG. 2. In this case, the capacity utilization is ascertained individually for each calendar day by counting the number of blocks reserved for the particular calendar day and the two previous and two subsequent days, then dividing by the total number of blocks corresponding to these five days. The capacity utilizations entered for the individual days in the figure are retained.

To take short-term capacity utilization spikes into account in a manner similar to the method described with reference to FIGS. 4 and 5, it may be provided, as a refinement of the method, that, when the total number of blocks already reserved on a day to be reserved and on the previous and following days exceeds a limit value, only these three days are taken into account when calculating the extent of capacity utilization, or that, when the number of reservations on the day to be reserved exceeds a second, higher limit value, the capacity utilization is defined only with reference to the reservations for this one day.

Figure 7:
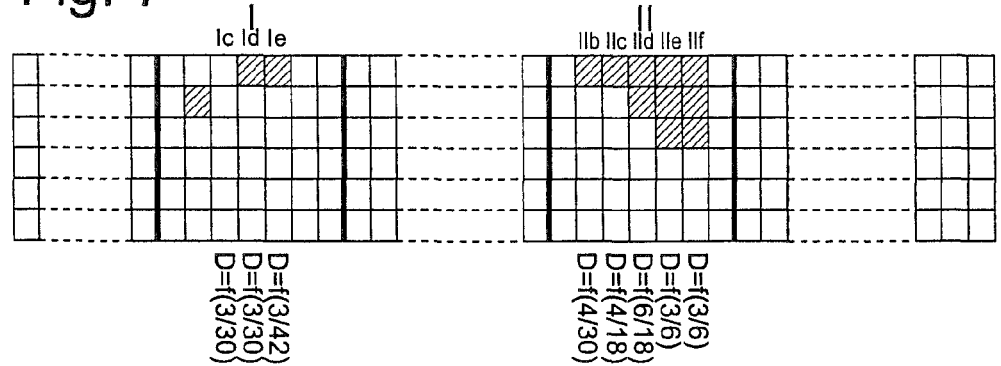
FIG. 7 shows a schematic illustration to explain a fourth method.

A further method for defining the extent of capacity utilization is explained with reference to FIG. 7. To define the extent of capacity utilization for a given day, the smallest symmetrical interval around the particular day which contains a specified number of reserved blocks, e.g., three, is determined. For days Ic, Id in week I, the time interval containing the minimum number of three reservations is five days long, thereby resulting in a capacity utilization of 3/30 for these days. In the case of day Ie, it is seven days, which corresponds to a capacity utilization of 3/42. In week II, the time interval for day IIb is five days long and contains four reservations, which corresponds to a capacity utilization of 4/30. For days IIc, IId, a three-day long interval results in each case with capacity utilizations of 4/18 and 6/18. For days IIe and IIf, the interval is one day long in each case, with a capacity utilization of 3/6.

Figure 8:
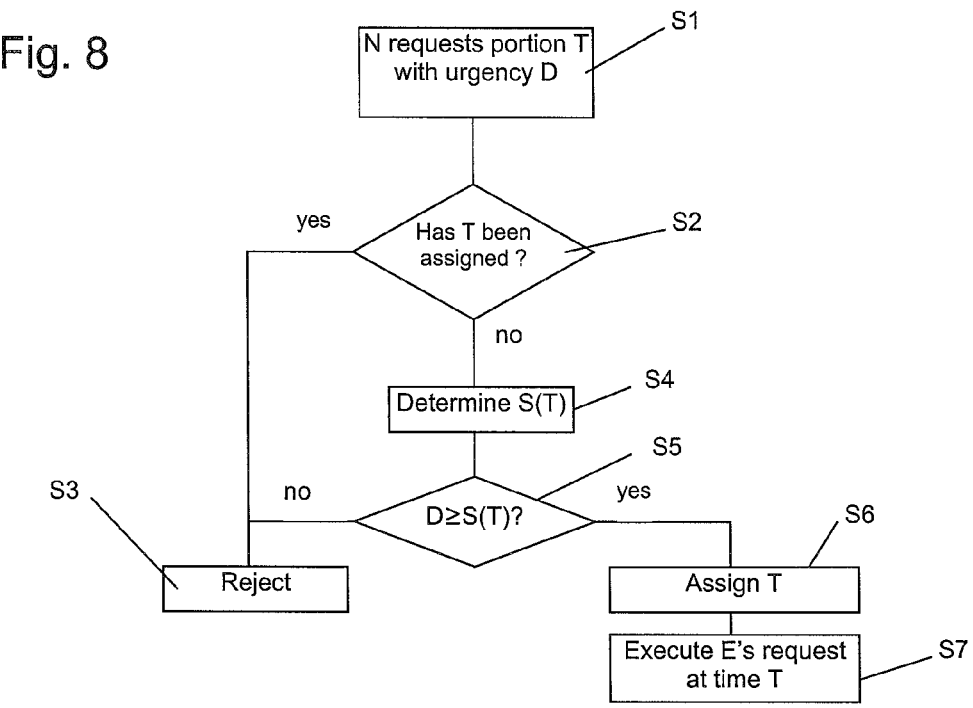
FIG. 8 shows a flow chart to explain a method carried out by the coordination device for assigning a data record to a user.

A working method of administration device 2, which may be used with any of the methods described above to define the capacity utilization, is depicted in FIG. 8 as a flow chart. In step S1, administration unit 1 receives from a user N or his end device 3 a request to reserve a portion T of the working capacity of machines 5 for this user N; the portion is defined at least by one unit of time, e.g., a calendar day on which the working capacity is required, and possibly by indicating desired machine 5. The portion therefore corresponds to one or more of the blocks or data records shown in FIGS. 2 through 7.

To clarify the description, it is assumed below that portion T corresponds to exactly one data record, although the case remains just as clear when generalized for several data records. Administration unit 2 initially checks, in step S2, whether particular portion T has already been assigned to another user. If so, the request from N must be rejected in step S3.

If portion T has not been assigned to a user, the administration unit ascertains—in step S4—a threshold S(T) for the urgency that the request from N must have before portion T may be reserved for him. This determination may take place by administration unit 2 ascertaining—at the point in time of step S4—the capacity utilization corresponding to requested portion T using one of the methods described above with reference to FIGS. 2 through 7, and calculating threshold S(T) as a monotonously increasing function f of the capacity utilization at the time of this portion T.

As an alternative possibility, the capacity utilization for the time of portion T may be ascertained at certain times or at specified time intervals of the time corresponding to portion T, and storing threshold S(T) corresponding to this capacity utilization in a table. In a case such as this, threshold S(T) remains unchanged between two points in time when updates are implemented, thereby enabling a user to better estimate urgency D required to make a successful reservation.

Next, in step 5, administration unit 2 compares urgency D reported by user N with threshold S(T) defined in step 4. When urgency D indicated by user N is at least as great as threshold S(T), related working time portion T is assigned to the user in step S6, and, in step 7, the administration unit sends—at the right time corresponding to portion T—a directive to one of the machines 5 to carry out the desired work for user N.

A user who reserves working capacity portions at an early point in time and therefore provides operator of machines 3 with a reliable plan is rewarded in that he need enter only a relatively low level of urgency in order to make a successful reservation. A user 3 who waits a long time before making a reservation must assume the risk that his request will not be fulfilled, because there is no more working capacity available, or it is fulfilled only if the urgency is high.

Figure 9:
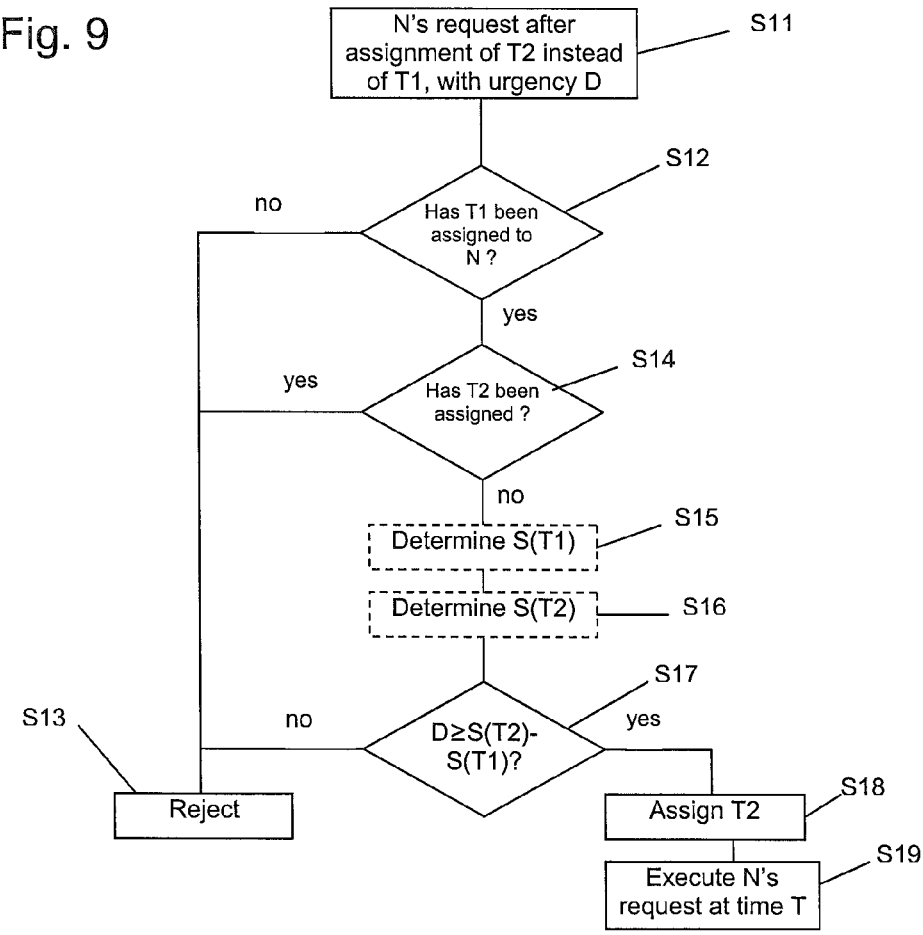
FIG. 9 shows a flow chart to explain a method for changing the assignment of a data record.

An early reservation of working capacity brings user N the risk that the reserved time or capacity may not suit his needs at a later point in time, e.g., because the quantities of crop material actually expected to be harvested deviate considerably from the quantities estimated at the time the reservation was made, or because, in retrospect, a period of time that differs from the one originally reserved proves to be more advantageous. To take this problem into account, administration unit 1 may be designed to also carry out—in addition to the method depicted in FIG. 8—the method described below with reference to FIG. 9.

In this case, administration unit 2 receives, in step S11, a request from user N—for whom a working time portion T1 has already been reserved—to make a reservation for another working time portion T2 instead. The administration unit first checks, in step S12, whether portion T1 stated in the request has actually been assigned to user N. If not, the request must be rejected, in step S13, since only those users may access portion T1 for whom it has actually been reserved. If portion T1 has actually been assigned to user N, a check is carried out in step S14 to determine whether portion T2 has been assigned to any users. If so, this request must be rejected, also in step S13. If not, thresholds S(T1) and S(T2) for portions T1 and T2, respectively, are determined in steps S15, S16. As described above with reference to step S4, the determination may be carried out based on a level of capacity utilization ascertained at the point in time of steps S15, S16, or based on a level of capacity utilization ascertained independently of the request, at an earlier point in time.

Step S17 compares urgency D indicated in the request in step S11 with the difference between thresholds S(T2) and S(T1). If the threshold for T2 is lower than that for T1, i.e., if the request for working time portion T2 is lower than that for T1, it is generally useful to also change the reservation for the operator of machines 3, so that, in step S18, portion T2 is reserved for user N and the reservation for portion T1 is cancelled. The same takes place when threshold S for portion T2 is higher than that for T1, but urgency D indicates it is at least as great as the difference between thresholds S(T2)−S(T1). In step S19, a directive to carry out work for user N is sent to one of the machines 3 in a timely manner before the time corresponding to portion T2.

It will be understood that each of the elements described above, or two or more together, may also find a useful application in other types of constructions and methods differing from the type described above.

While the invention has been illustrated and described as embodied in a device and method for coordinating a machine fleet, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

The invention claimed is:

1. A device for coordinating a machine fleet, comprising
a memory for storing a large number of data records;
an interface for communicating with several users;
an administration unit for making changes to the data records in reaction to users' requests;
wherein said memory is configured so that each data record represents a given portion of a working capacity of a machine in the machine fleet and includes an urgency threshold assigned to said data record by said administrative unit; and
wherein said administration unit is configured so that the changes relate to an assignment of a portion of the working capacity represented by the data records to users making the change request and to implement a change to a data record when so requested by a user if the data record is not assigned to any other user, and when an urgency of the change indicated by the user which provides the change request reaches a threshold urgency specified for the given portion of working capacity represented by the data record; and wherein the urgency and the urgency threshold are quantified monetarily to reflect a decreasing difference in time between a time at which the user makes the change request and a time associated with the requested data record change.

2. A device as defined in claim 1, wherein said administration unit is configured so that a specification for determining a distance between two data records is programmed in said administration unit, said administration unit being configured also so as to define the threshold based on a frequency of assigned data records within data records located close to a data record to be changed.

3. A device as defined in claim 2, wherein said memory is configured so that each of the data records corresponds to an operating period for one machine in the machine fleet, and the distance is a measure of a time interval between two data records.

4. A device as defined in claim 3, wherein said administration unit is configured so as to ascertain a frequency of assigned data records within data records located close to a given data record at predefined time intervals from a time corresponding to the data record.

5. A device as defined in claim 3, wherein said administration unit is configured to ascertain a frequency of assigned data records within data records located close to a given data record every time there is a request for a given data record.

6. A device as defined in claim 3, wherein said administration unit is configured so that the threshold is a decreasing function of a time interval between a present and a time corresponding to the data record.

7. A device as defined in claim 1, wherein the machine fleet includes several machines that are suitable for a same task, said memory being configured so that a distance between two data records assigned to the two machines suitable for the same task is independent of an identity of the machines.

8. A device for coordinating a fleet of mobile agricultural machines, comprising
a memory for storing a large number of data records;
an interface for communicating with several users; and
an administration unit for changing the data records in reaction to requests from the users;
wherein said memory is configured so that each data record represents a given portion of a working capacity of a machine in the machine fleet and so that an urgency threshold is assigned to each data record by said administration unit,
wherein said administration unit is configured so that the changes relate to an assignment of a portion of a working capacity represented by the data record to the users making the change, and so that said administration unit cancels, upon a request of a user, an assignment of a data record to the user, and assigns a new data record to said user if an urgency threshold for the new data record is lower than the urgency threshold for the originally assigned data record; and
wherein the urgency thresholds of the original data record and the new data record are quantified monetarily to reflect a decreasing difference in time between a time at which the user makes the change request and a time associated with the new data record.

9. A device as defined in claim 1, wherein said administration unit is configured to cancel—upon a request of a user— an assignment of a data record to this user, and to assign a new data record to this user if an urgency specified for a re-assignment is at least as great as a difference between the threshold for the new data record and the threshold for the originally assigned data record.

10. A device as defined in claim 1, wherein the machines in the machine fleet are mobile agricultural machines.

11. A method, operating on a digital computer comprising an administration unit and a memory, for coordinating a machine fleet, comprising steps of
providing a large number of data records in the memory, wherein each data record represents a given portion of a working capacity of a machine in the machine fleet and includes a specified urgency threshold;
receiving a request from a user to change a data record with the change related to an assignment of the given portion of the working capacity represented by the data record to the user requesting the change; and
the administration unit implementing the requested change if the data record is not assigned to any other user and an urgency of the requested change indicated by the user providing the request reaches the urgency threshold specified for the given portion;
wherein the urgency and the urgency threshold are quantified monetarily to reflect a decreasing difference in time between a time at which the user makes the change request and a time associated with the requested data record.

12. A method as defined in claim 11, further comprising ascertaining a frequency of assigned data records within data records located near the data record; and defining the threshold based on the frequency.

13. A method as defined in claim 12, further comprising forming each data record so that it corresponds to an operating period of a machine and the machine fleet; and based on a time interval between the data record to be changed and another data record, making a decision whether the other data record is located close to the data record to be changed.

14. A method as defined in claim 13, further comprising ascertaining a frequency of assigned data records within data records located close to a given data record at specified points in time; and, if there is a request to change a given data record, defining the threshold based on a frequency that was determined most recently.

15. A method as defined in claim 13, further comprising, if there is a request to change a given data record, ascertaining a frequency of assigned data records within data records located close to the given data; and defining then the threshold based on the frequency that was determined.

16. A method as defined in claim 13, further comprising defining the threshold as a decreasing function of a time interval between a present and a time corresponding to the data record.

17. A method as defined in claim 11; and further comprising evaluating as to whether two data records assigned to two machine are suitable for a same task, one of which is located close to the other, independently of an identity of the machines.

18. A method, operating on a digital computer comprising an administration unit and a memory, for coordinating a fleet of mobile agricultural machines, comprising steps of
providing a large number of data records in a memory with each data record representing a given portion of a working capacity of a machine in the machine fleet and including a specified urgency threshold;
receiving a request from a user to change from an originally assigned data record to a new data record; and
the administration unit canceling an assignment of the originally assigned data record to the requesting user; assigning a new data record to the requesting user; and implementing the requested change if the new data record is not assigned to any other users and if a specified urgency threshold for the new data record is lower than the specified urgency threshold for the originally assigned data record; and wherein the specified urgency threshold of originally assigned data record and the new data record are quantified monetarily to reflect a decreasing difference in time between a time at which the user makes the change request and a time associated with the requested new data record.

19. A method as defined in claim 11, further comprising, upon request of a user, canceling an assignment of a data record to this user; assigning a new data record to this user if an urgency specified for a re-assignment is at least as great as a difference between a threshold for the new data record and a threshold for an originally assigned data record.

20. A method as defined in claim 11, wherein the machines in the machine fleet are mobile agricultural machines.

* * * * *